United States Patent [19]
Athey et al.

[11] Patent Number: 5,297,389
[45] Date of Patent: Mar. 29, 1994

[54] METHOD AND APPARATUS FOR MAINTAINING A REQUIRED TEMPERATURE DIFFERENTIAL IN VACUUM DEAERATORS

[75] Inventors: Roderick E. Athey, Pittsford, N.Y.; Elliot Spencer, Cranbury, N.J.; Lance L. Frens, Byron, N.Y.

[73] Assignee: Graham Corporation, Batavia, N.Y.

[21] Appl. No.: 926,349

[22] Filed: Aug. 6, 1992

Related U.S. Application Data

[62] Division of Ser. No. 666,807, Mar. 8, 1991, Pat. No. 5,165,237.

[51] Int. Cl.$^5$ .................................. F01K 19/00
[52] U.S. Cl. .................................. 60/657; 60/646; 95/266; 96/200
[58] Field of Search ............... 60/646, 656, 657, 685, 60/689, 692; 95/260, 266; 96/194, 200, 204

[56] References Cited

U.S. PATENT DOCUMENTS

| | | | |
|---|---|---|---|
| 2,430,086 | 11/1947 | Staff | 562/606 |
| 2,539,889 | 1/1951 | Bradford | 554/157 |
| 2,664,429 | 12/1953 | Goebel | 562/509 |
| 2,934,547 | 4/1960 | Ruddick | 554/208 |
| 2,956,784 | 7/1958 | Parkinson | 165/112 |
| 3,004,714 | 10/1961 | Fearon | 237/67 |
| 3,091,098 | 5/1963 | Bowers | 96/200 X |
| 3,135,322 | 6/1964 | Neugebauer | 165/158 |
| 3,173,935 | 3/1965 | Singleton | 554/194 |
| 3,572,036 | 3/1971 | Beckman et al. | 60/646 |
| 3,629,994 | 12/1971 | Jones | 55/20 |
| 3,932,150 | 1/1976 | Komai et al. | 55/160 |
| 4,003,205 | 1/1977 | Matsumura | 60/646 |
| 4,089,880 | 5/1978 | Sullivan | 554/176 |
| 4,345,976 | 8/1982 | Peter et al. | 203/49 |
| 4,406,836 | 7/1983 | Miserlis | 554/205 |
| 4,627,386 | 12/1986 | Duffy et al. | 122/113 |
| 4,631,925 | 12/1986 | Ohtake et al. | 60/688 |
| 4,732,004 | 3/1988 | Brand et al. | 60/646 |
| 4,748,815 | 6/1988 | Junior et al. | 60/692 |
| 4,776,170 | 10/1988 | Blangetti | 60/689 |
| 4,873,829 | 10/1989 | Williamson | 60/670 |

FOREIGN PATENT DOCUMENTS

| | | |
|---|---|---|
| 300929 | 5/1916 | Fed. Rep. of Germany. |
| 1110615 | 7/1961 | Fed. Rep. of Germany. |
| 936732 | 7/1948 | France. |
| 659771 | 1/1976 | U.S.S.R.. |
| 906413 | 9/1962 | United Kingdom. |

OTHER PUBLICATIONS

Kubik and Spencer, Improved Steam Condenser Removal System Heat Transfer, 1988, HTD–vol. 104, pp. 255–263.

Stanley, Case Study–Real Life Optimization of a 120 MW Combined Cycle Cogeneration Plant. Presented at the Joint ASME/IEEE Power Generation Conference, Miami Beach, Fla.–Oct. 4–8, 1987, 87-JPGW-Pwr-9.

Spencer and Impagliazzo, Enhanced Condenser Venting for Condensate Oxygen Control. 84-JPGC-Pwr-32, No Date Given.

Athey and Spencer. Continuous Vacuum Deaeration of Condenser Makeup Water, No Date Given.

Athey and Spencer, Total Systems Approach to Condenser Oxygen Control as Applied to a Combined Cycle Cogeneration Power Plant. Surface Condenser Design, Installation, and Operating Experience-NE. vol. 1. (Book No. 10024), No Date Given.

Westingtonhouse Electric Corporation, Evaluation and Improvement of PWR Secondary-System Oxygen Control Measures, No Date Given.

Primary Examiner—Stephen F. Husar
Attorney, Agent, or Firm—Cumpston & Shaw

[57] ABSTRACT

A method and apparatus for providing a required deaerating temperature differential between incoming water and sparge steam in a steam generation system having a vacuum deaerator. The present invention selectively combines raising the energy of the sparge steam with flash cooling of the incoming water to provide the required deaerating temperature differential. The energizing of the sparge steam is accomplished by a thermocompression device. The thermocompression device may also be used to reduce the pressure in a portion of the vacuum deaerator to cause the flash cooling of the incoming water.

9 Claims, 5 Drawing Sheets

METHOD AND APPARATUS FOR MAINTAINING A REQUIRED TEMPERATURE DIFFERENTIAL IN VACUUM DEAERATORS

This is a divisional of copending application Ser. No. 07/666,807 filed on Mar. 8, 1991.

FIELD OF THE INVENTION

The present invention relates to a method and apparatus for deaerating incoming water in a steam generation plant, and more particularly, to the maintenance of a required deaerating temperature differential in a vacuum deaerator when the temperature differential between the available sparge steam and the incoming water does not satisfy the required deaerating temperature differential.

DESCRIPTION OF RELATED ART

Power plant and steam generation systems raise the temperature of boiler feed water to create steam for driving turbines, or for distribution to users. The boiler feed water may consist of condensate, treated water, or a mixture of both. Upon exposure to atmospheric air, boiler feed water absorbs oxygen.

In addition to contact with atmospheric air, the portions of the system operating under a vacuum are susceptible to the absorption of oxygen by the leakage of air through low pressure pump seals, steam turbine gland seals, as well as fluid storage systems.

Dissolved oxygen in the circulated fluids is perhaps the greatest factor in the corrosion of steel surfaces in steam generation plants. An oxygen rich environment at an elevated temperature, such as those within steam generators or steam piping, is highly corrosive. The resulting internal corrosion can drastically reduce the operating life of a steam generation system. Therefore, the amount of dissolved oxygen introduced to the system must be minimized.

Typically, the standard power cycle is designed to operate at a continuous full load. Makeup water requirements are usually less than 3-5% of the total boiler feed water flow rate. The 3-5% makeup is attributed to replacing water lost to leakage, sampling, or boiler blow down. Although the makeup water may be highly oxygenated, when such a small amount is introduced into the condenser, the impact on the system is reduced.

However, power plants exporting steam for district heating, as well as cogeneration plants, are faced with stringent deaeration problems inherent in introducing large volumes of makeup water saturated with oxygen into the system. In fact, any plant requiring deaeration of makeup water exceeding 3-5% of the total condenser flow rate, must deaerate the makeup water in a manner other than introducing it over the condenser tubes.

In an attempt to deaerate relatively large volumes of makeup water, the prior art has employed pressure deaerators and chemical scavenging agents. In the standard cycle employing pressure deaerators, relatively large quantities of makeup water can be deaerated. However, as pressure deaerators require a relatively high level of energy to deaerate the makeup water, the overall efficiency of the system is reduced.

Although chemical oxygen scavengers can be used to deaerate the makeup water, their use is limited. Chemical scavengers are extremely expensive and often toxic. In fact, the toxicity of many chemical scavengers precludes their use in any systems associated with food processing.

While the prior art systems may effectively deaerate throughout the entire capacity range of the power cycle for the high pressure portion of the boiler feed water cycle, the portion of the cycle under a low pressure, or a vacuum, does not receive adequate deaeration. The inadequate deaeration allows the buildup of elevated levels of oxygen which corrode the low pressure portion of the system.

Vacuum deaerators provide deaeration in low pressure portions of the cycle. However, in order to effectively deaerate incoming water, vacuum deaerators require a temperature differential between the sparge steam and the incoming water. The relationship between the temperature of the incoming water and the sparge steam is such that as the temperature differential increases, the effectiveness of deaeration of the incoming water increases. While some deaeration may occur at a temperature differential of only a few degrees, the amount of deaeration increases as the temperature differential increases. The required temperature differential to sufficiently deaerate the incoming water is determined by system design considerations including the anticipated volume and oxygen content of the incoming water.

Upon determining the required deaerating temperature differential necessary for sufficient oxygen removal, the system must be able to achieve and maintain that temperature differential to ensure the proper deaeration of the incoming water. When the sparge steam is turbine exhaust steam, the steam temperature is set by the condenser operating pressure. Therefore, any fluctuations in the incoming water temperature or in the condenser operating pressure can affect the efficiency of the vacuum deaerator.

Therefore, a need exists for creating and maintaining a required temperature differential in a vacuum deaerator. The need exists for providing the required deaerating temperature differential in a vacuum deaerator for those power cycles requiring large quantities of makeup water, or return condensate, which have high levels of dissolved oxygen.

A need also exists for providing a required deaerating temperature differential in a vacuum deaerator to effectively deaerate large quantities of stored condensate, so that the power cycle can be quickly restarted by using the available low pressure steam during the startup phase of the cycle.

SUMMARY OF THE INVENTION

A method and apparatus for maintaining a required deaerating temperature differential in a vacuum deaerator for deaerating incoming water in steam generation plants is disclosed. As used herein, incoming water includes, but is not limited to, condensate returns, makeup water and any liquid being supplied to the steam generation system which requires dissolved oxygen control. The present invention provides the required temperature differential in a vacuum deaerator to deaerate large volumes of incoming water through a range of temperatures so that the water may be introduced into the steam generation system without introducing oxygen into the system.

The present invention includes four configurations in a steam generation system having a main condenser, a vacuum deaerator and a venting system, for creating and maintaining the required deaerating temperature differential in the vacuum deaerator.

The first configuration accommodates hot incoming water. That is, incoming water having a temperature such that the temperature differential between the available steam and the incoming water is less than the required deaerating temperature differential.

In the first configuration, the pressure in a cooling section of the vacuum deaerator is reduced to a pressure at which the incoming water flash cools as it is introduced into the cooling section. A thermocompression device withdraws a portion of the water vapor from the incoming water, thereby ensuring flash cooling, and raises the energy of the withdrawn vapor. The energized vapor is then introduced into a deaerating section of the vacuum deaerator to assist in deaeration of the incoming water.

In the second configuration, the hot incoming water is introduced into the vacuum deaerator without flash cooling. Available steam is passed through a thermocompression device to raise the temperature and pressure of the steam thereby forming sparge steam. The temperature of the sparge steam is sufficient to ensure the required deaerating temperature differential exists between the incoming water and the sparge steam.

The third configuration accommodates incoming water having a temperature greater than that of the available steam. In this configuration, the sparge steam is passed through a thermocompression device before it is introduced into the vacuum deacrator. In addition, the pressure in the cooling section of the vacuum deaerator is reduced so that the incoming water flash cools as it is introduced into the vacuum deaerator. The combined flash cooling of the incoming water and thermocompression of the sparge steam creates the required deaerating temperature differential.

In the fourth configuration, the hot incoming water is introduced into the vacuum deaerator without inducing flash cooling. The sparge steam is withdrawn from the relatively high pressure steam available at an intermediate stage of the venting system. The sparge steam from the venting system is introduced into the vacuum deaerator to provide the required deaerating temperature differential.

DETAILED DESCRIPTION OF THE PREFERRED EMBODIMENTS BASIC SYSTEM

Figure 1:
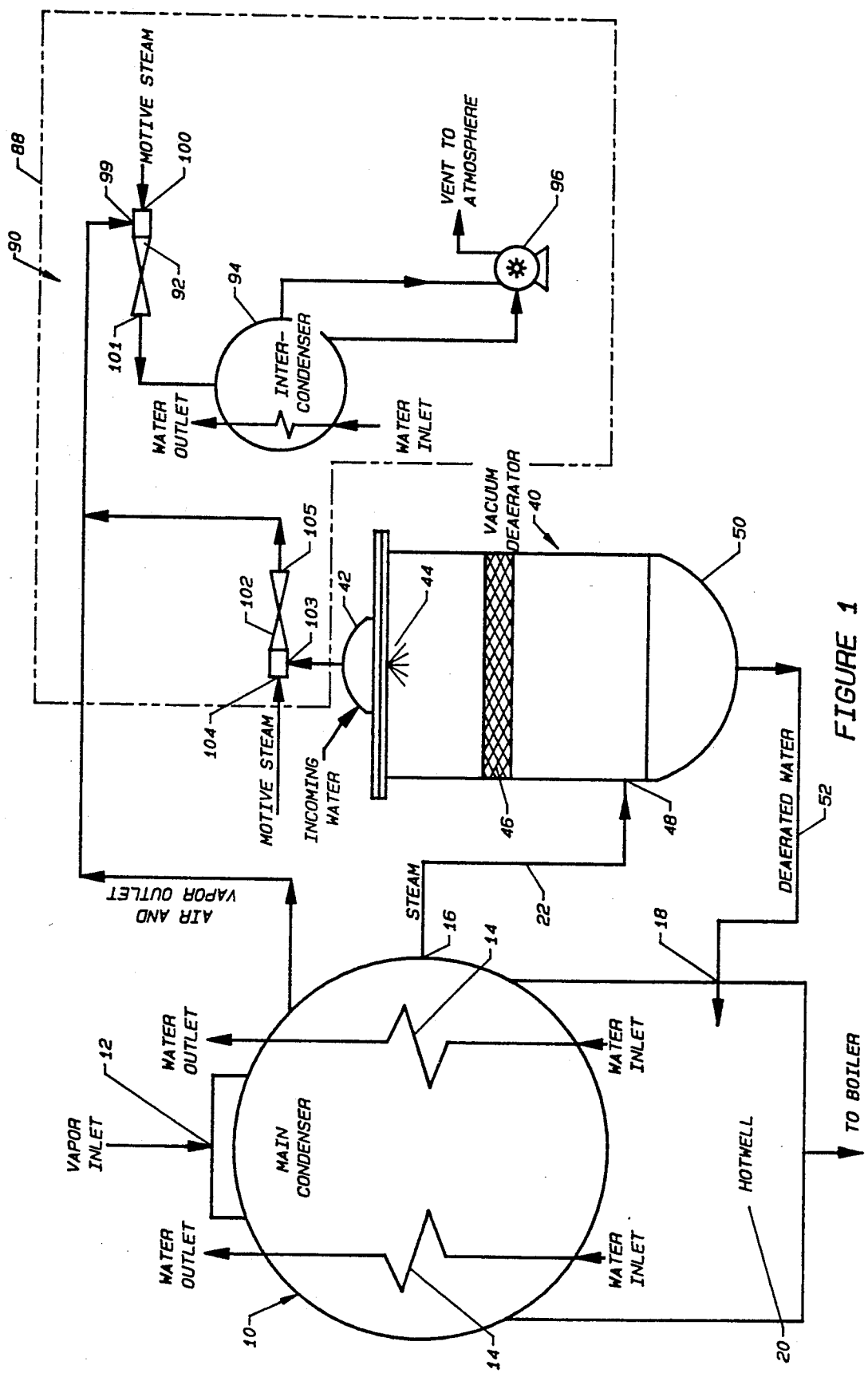
FIG. 1 is a schematic plan of a basic system employed in the present invention.

Each configuration of the present invention incorporates a basic system. Referring to FIG. 1, the basic system includes a main condenser 10, a vacuum deaerator 40, and a venting system 90.

Main Condenser

The main condenser 10 includes a vapor inlet 12, a cooling water tube bundle 14, a steam outlet 16, a return port 18, and a hotwell 20.

Turbine exhaust steam is directly discharged into the main condenser 10 through the vapor inlet 12. The cooling water tube bundle 14 extends the length of the condenser 10 to provide a surface upon which the exhaust steam condenses. A cooling fluid such as lake or river water, or cooling tower water is circulated through the tube bundle 14. The steam condenses on the tube bundle 14 and the condensate descends to be collected in the hotwell 20 at the bottom of the condenser 10. The condensate is recirculated to the boiler from the hotwell 20.

Vacuum Deaerator

The vacuum deaerator 40 is a self-contained unit connected to the main condenser 10 through a sparge line 22 and a return line 52. Although shown as an individual unit, the vacuum deaerator 40 may be integrated into the main condenser 10 as described infra.

As used herein, the term "vacuum deaerator" designates deaeration equipment which utilizes relatively low temperature steam to heat and scrub incoming water under a vacuum to at least partially remove dissolved oxygen and other noncondensible gases from the water. Preferably, the vacuum deaerator 40 is a vapor/liquid contact device which provides a sufficient residence time and contact surface area between the incoming water and the sparge steam to deaerate the incoming water at the required deaerating temperature differential.

As used herein, sparge steam includes, but is not limited to, turbine exhaust steam, steam from within the main condenser 10, steam from the main ejector system, or any other source of steam available for the deaeration of the incoming water.

As shown in FIG. 1, the vacuum deaerator 40 includes a water box 42 through which the incoming water is introduced. The water box includes spray valves 44 which produce a uniform spray film, thereby increasing the available surface area of the incoming water. Preferably, the spray valves 44 are located in the top of the vacuum deaerator 40, so that the spray produced descends uniformly down the vacuum deaerator. The vacuum deaerator 40 includes packing 46 below the spray valves 44 to increase residence time between the incoming water and the sparge steam. The packing 46 may be formed of a high performance metal tower packing, or any other acceptable packing. Although the present invention may be practiced without the packing 46, preferably the packing is employed. The sparge steam is introduced into the vacuum deaerator 40 through a sparge port 48. The sparge port 48 is remote from the spray valves 44 and preferably beneath the packing 46. A reservoir 50 is located in the bottom of the vacuum deaerator 40 for collecting the deaerated water. The reservoir 50 is fluidly connected to the hotwell 20 by the return line 52.

Although the vacuum deaerator 40 is shown as an independent self-contained unit, the vacuum deaerator may be attached to, or contained within the main condenser 10. That is, the vacuum deaerator 40 may share a common wall with the main condenser 10, or be enclosed within the condenser.

Venting System

Referring to FIG. 1, the venting system 90 is enclosed by the dotted line 88. The venting system 90 withdraws noncondensible gas and water vapor from the vacuum deaerator 40 and from the main condenser 10. The venting system 90 withdraws a sufficient volume of noncondensible gas and water vapor from the vacuum deaerator 40 to provide a low oxygen partial pressure, and in accordance with Henry's Law, to cause the release of dissolved gases from the incoming water and to substantially preclude reabsorption of noncondensible gases into any liquid phases present in the vacuum deaerator. That is, the venting system 90 must be able to maintain a low partial pressure of oxygen inside the vacuum deaerator 40. Preferably, the venting system 90 is fluidly connected to the main condenser 10 and the vacuum deaerator 40 so that the reduced partial pressure of oxygen is maintained in both the condenser and the vacuum deaerator. However, the main condenser 10 and the vacuum deaerator 40 may have independent venting systems. The connection of the venting system 90 to the vacuum deaerator 40 is dictated by the desired configuration of the system.

The venting system 90 preferably utilizes a hybrid vacuum system to remove the noncondensible gases and a large volume of water vapor from the main condenser 10 and vacuum deaerator 40. However, any other venting system known in the art having sufficient capacity for withdrawing the necessary volume of water vapor and noncondensible gases from the main condenser 10 and vacuum deaerator 40 may be employed. The hybrid vacuum assembly includes a first stage steam ejector 92 discharging into an intercondenser 94, which is coupled to discharge into a liquid ring vacuum pump 96.

An auxiliary deaerator steam ejector 102 may be used to assist in the withdrawal of water vapor and noncondensible gases from the vacuum deaerator 40. As shown in FIG. 1, the auxiliary deaerator steam ejector 102 has an inlet 103 fluidly connected to the vacuum deaerator 40, a motive steam in outlet 104, and an outlet 105 fluidly connected to the inlet 99 of the first stage steam ejector 92.

Operation of the Basic Cycle

Referring to FIG. 1, in the basic cycle, turbine exhaust steam is introduced into the main condenser 10 through the vapor inlet 12. The exhaust steam is condensed on the cooling tube bundles 14, collected in the hotwell 20 and recirculated to the boiler (not shown). To deaerate incoming water in the basic system, a portion of the turbine exhaust steam is withdrawn from the main condenser 10 through the steam outlet 16 and introduced into the vacuum deaerator 40 as the sparge steam.

The incoming water is introduced into the vacuum deaerator 40 through the water box 42 and descends through the vacuum deaerator as a uniform spray of droplets. As the sparge steam enters the vacuum deaerator through the sparge port 48 below the water box 42 and the packing 46, the sparge steam rises though the packing 46 countercurrent to the descending incoming water.

As the sparge steam rises through the packing 46, the steam contacts the descending water droplets. The sparge steam heats and scrubs the droplets thereby releasing noncondensible gases from the water. The deaerated incoming water is raised to a temperature substantially equal to the temperature of the sparge steam.

The venting system 90 maintains a ratio of steam to air in the vacuum deaerator 40 so that the partial pressures limit the solubility of oxygen into the liquid phase, as dictated by Henry's law. That is, by reducing the partial pressure of oxygen, the venting system 90 permits the release of dissolved gases from the liquid phase and prevents the released oxygen from redissolving into the liquid phase. The liberated noncondensible gases are removed from the vacuum deaerator 40 by the venting system 90 and discharged from the system.

The deaerated incoming water is collected in the reservoir 50 below the packing 46 in the bottom of the vacuum deaerator 40. In the basic system, the deaerated water is transferred to the hotwell 20 through the return line 52. As the sparge steam is at approximately the same temperature as the condensate in the hotwell 20, the deaerated water is also at approximately the same temperature as the condensate.

In order for the basic system to obtain the desired release of oxygen from the incoming water, the required temperature differential across the vacuum deaerator 40, between the incoming water and the sparge steam, must be achieved and maintained. If the temperature differential between the incoming water and the sparge steam is less than the required deaerating temperature differential, excess oxygen remains in the incoming water.

Figure 2:
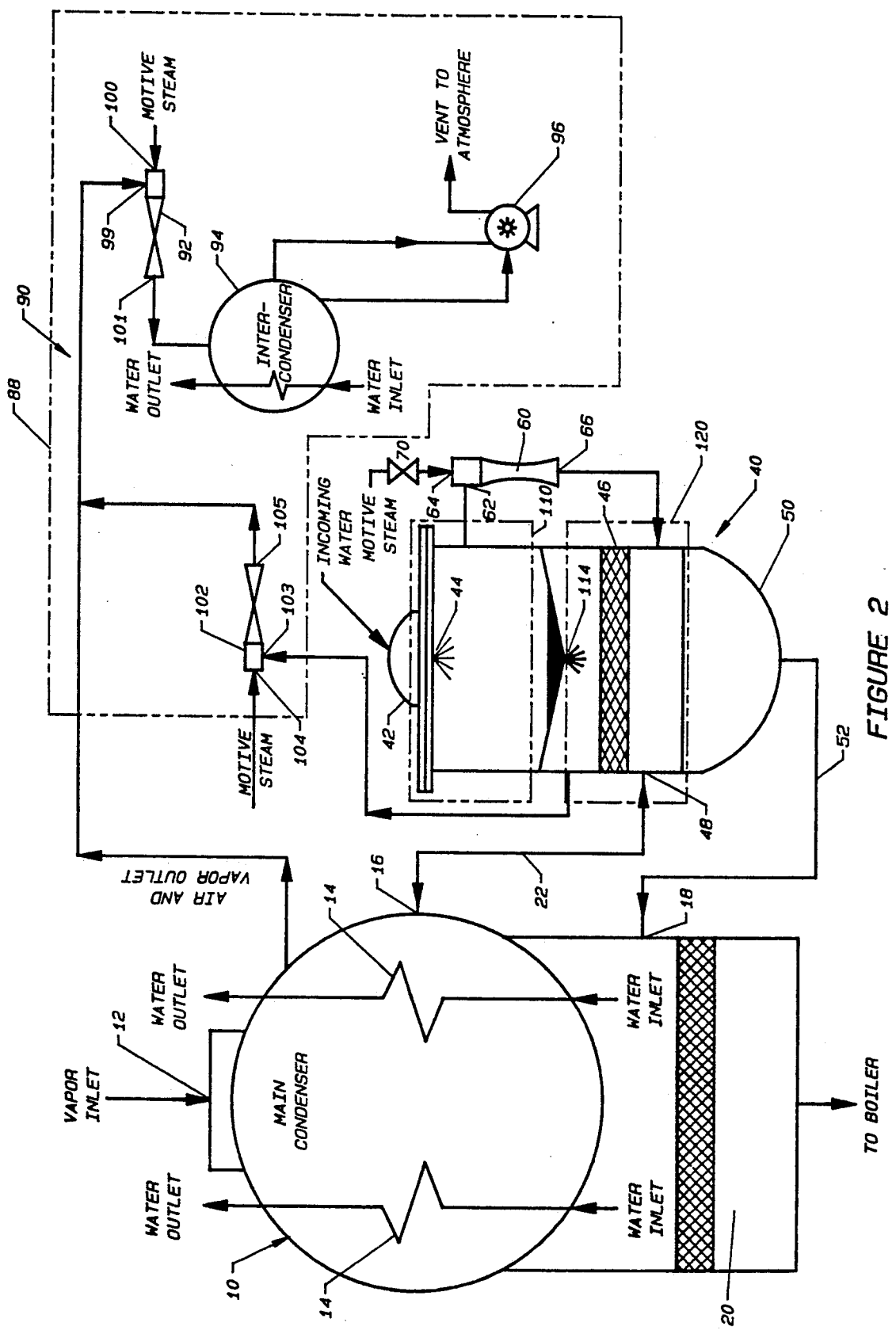
FIG. 2 is a schematic plan of a first configuration of the present invention.
Figure 3:
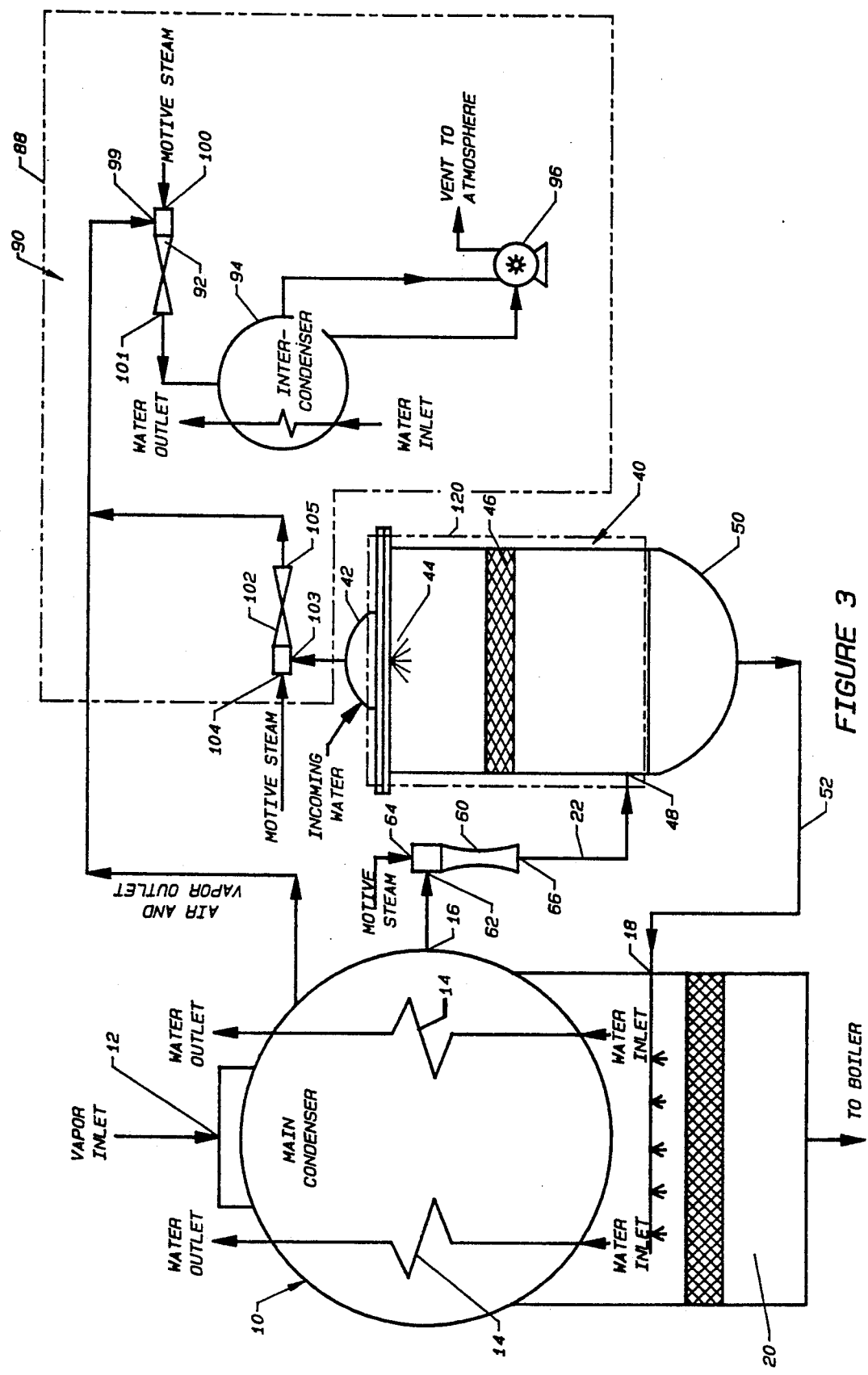
FIG. 3 is a schematic plan of a second configuration of the present invention.
Figure 4:
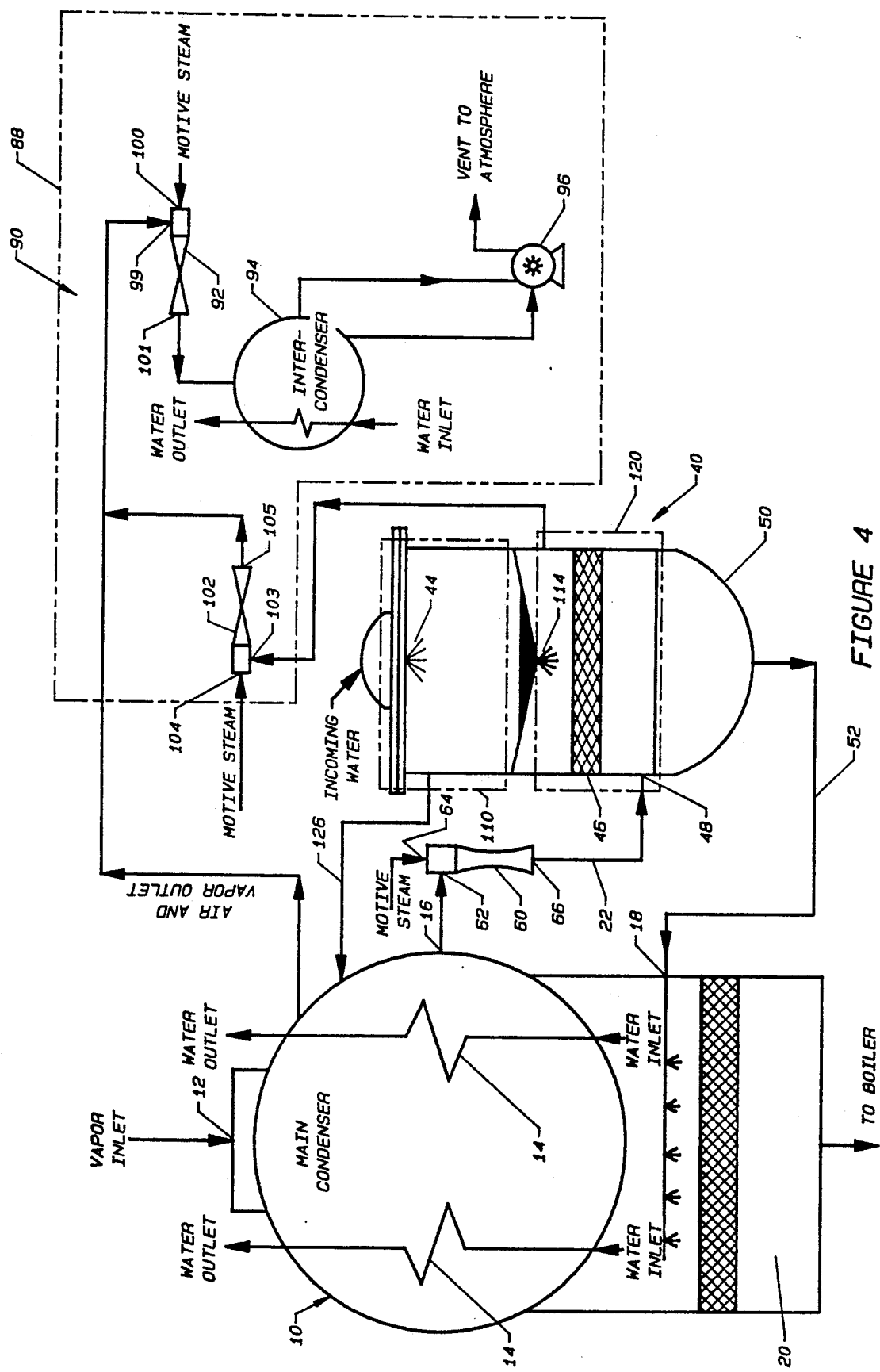
FIG. 4 is a schematic plan of a third configuration of the present invention.

In order to provide deaeration of incoming water when the temperature differential is insufficient, the present invention employs four configurations. Preferably, each configuration provides a required deaerating temperature differential of at least 5° F., and deaerates the incoming water to less than approximately 0.005 cc $O_2$/liter $H_2O$ (7 parts per billion $O_2$). As shown in FIGS. 2–4, each of the first three configurations employ a thermocompression device 60. In the fourth configuration shown in FIG. 5, the thermocompression device 92 is also the first stage ejector in the venting system 90. The thermocompression device 60 may be a steam operated ejector (a thermocompressor), a mechanical compression device, or any other device used to elevate the pressure and temperature of the vapor, as known in the art. As described herein, the thermocompression device 60 is a steam operated ejector. The thermocompression device raises the energy (temperature and pressure) of a vapor. The thermocompressor includes an inlet 62 for drawing vapor into the device, a motive steam inlet 64 and an outlet 66 for exhausting the energized vapor.

First Configuration

Referring to FIG. 2, the first configuration accommodates incoming water having a temperature too near the temperature of the sparge steam to attain the required deaerating temperature differential.

The vacuum deaerator 40 in the first configuration includes a cooling section 110 and a deaerating section 120, such that with respect to the flow of incoming water through the vacuum deaerator, the cooling section 110 is upstream of the deaerating section 120. The cooling section 110 and the deaerating section 120 are separated by a fluid seal. A spray nozzle 114 provides fluid communication from the upstream section to the downstream section.

The inlet 62 of the thermocompressor 60 is fluidly connected to the vacuum deaerator 40 so as to withdraw vapor from the cooling section 110. The output 66 of the thermocompressor 60 is fluidly connected to the deaerating section 120 of the vacuum deaerator 40 downstream from the packing 46. The sparge line 22 connects the main condenser 10 to the deaerating section 120 of the vacuum deaerator 40 downstream from the packing 46. The sparge line 22 permits bidirectional fluid communication between the vacuum deaerator 40 downstream of the packing 46 and the main condenser 10. The inlet 103 of the auxiliary dearator steam ejector 102 of the venting system 90 is fluidly connected to the deaerating section 120 of the vacuum deaerator 40 upstream of the packing 46. The return line 52 fluidly connects the reservoir 50, downstream of the deaerating section 120, and the hotwell 20.

Operation of the First Configuration

As shown in FIG. 2, in the first configuration, the incoming water is introduced through the water box 42 and spray valves 44 into the cooling section 110 of the vacuum deaerator 40.

The thermocompressor 60 withdraws vapor from the cooling section 110, thereby reducing the pressure in the cooling section and removing energy from the water. The reduced pressure in the cooling section 110 causes the incoming water to flash cool before it passes through nozzle 114 and is introduced into the deaerating section 120. "Flash cooling" is a term of art for reducing a system pressure so that at least a portion of a liquid phase in the system is vaporized to at least partially cool the remaining liquid.

The incoming water is flash cooled to a sufficiently reduced temperature so that the required deaerating temperature differential across the deaerating section 120 between the flash cooled incoming water and the sparge steam is attained. The cooled incoming water is collected above the fluid seal separating the deaerating section 120 and the cooling section 110. The cooled incoming water passes through the nozzle 114 into the deaerating section 120 where it contacts the packing 46. The nozzle 114 produces a spray of droplets in the deaerating section 120.

The withdrawn vapor from the cooling section 110 is passed through the thermocompressor 60 to increase the pressure and temperature. Preferably, the thermocompressor 60 employs an external source of higher pressure motive steam to increase the energy of the vapor. The energized vapor is introduced into the deaerating section 120 of the vacuum deaerator 40 downstream of the packing 46. As discussed infra, the amount of vapor withdrawn and the increase in energy of the withdrawn vapor is controlled to provide the required deaerating temperature differential.

The sparge steam is preferably formed from turbine exhaust steam withdrawn from the main condenser 10 and the energized vapor from the thermocompressor 60. The turbine exhaust steam travels through the sparge line 22 and is introduced into the vacuum deaerator 40 downstream of the packing 46. When the amount of the thermocompressor output is greater than required by the vacuum deaeration process, the excess output vents back to the main condenser 10 through the sparge line 22. Therefore, the temperature and pressure of the steam in the main condenser 10 remains substantially equal to the temperature and pressure of the sparge steam in the deaerating section 120 of the vacuum deaerator 40.

The energized vapor joins the steam from the condenser 10 and ascends through the deaerating section 120. The ascending sparge steam meets the descending flash cooled water in the deaerating section 120. The incoming water is deaerated and heated to approximately the same temperature as the sparge steam and is collected in the reservoir 50 of the vacuum deaerator.

The venting system 90 removes sufficient water vapor from the deaerating section 120 to cause the release of dissolved gases from the liquid phase and to prevent reabsorption of gaseous oxygen into the water. The deaerated water is returned to the hotwell 20 through the return line 52, or transported to other portions of the power cycle.

The flash cooling and subsequent reheating of the incoming water in the vacuum deaerator 40 by the thermocompressor 60 ensures that the required deaerating temperature differential is maintained.

As the temperature of the incoming water may vary with time, the amount of heating required by the thermocompressor 60 also varies. Preferably, the amount of pressure reduction in the cooling section and the amount of heating performed by the thermocompressor 60 is controlled by an automatic or manual throttling device 70 to maintain the required deaerating temperature differential.

Second Configuration

Referring to FIG. 3, the second configuration also accommodates incoming water whose temperature is too near to the temperature of the available steam to attain the required deaerating temperature differential. In the second configuration, the required deaerating temperature differential is achieved by increasing the pressure and temperature of the available steam to form the sparge steam.

In the second configuration, the vacuum deaerator 40 includes only a deaerating section 120. The inlet 103 of the auxiliary deaerator steam ejector 102 of the venting system 90 is connected to the vacuum deaerator 40 upstream of the packing 46. A thermocompressor 60 is fluidly connected to the sparge line 22, such that the inlet 62 of the thermocompressor withdraws steam from the main condenser 10. The outlet 66 of the thermocompressor 60 is fluidly connected to the vacuum deaerator 40 downstream from the packing 46.

Operation of the Second Configuration

The thermocompressor 60 withdraws a portion of the turbine exhaust steam from the main condenser 10 to form the sparge steam. The thermocompressor 60 raises the temperature and pressure of the sparge steam to attain the required deaerating temperature differential between the sparge steam and the incoming water. The sparge steam, therefore, has a higher temperature and pressure than the steam and condensate in the main condenser 10.

The incoming water is introduced into the vacuum deaerator 40 through the water box 42. The incoming water passes through the spray valves 44 of the water box 42 to form droplets. As the incoming water descends through the packing 46, the ascending sparge steam scrubs, heats, and deaerates the water. The venting system 90 withdraws a sufficient volume of water vapor and noncondensible gas from the vacuum deaerator, to cause the release of dissolved gases from the liquid phase, and to prevent oxygen from being reabsorbed into the liquid phase.

The incoming water is heated to approximately the temperature of the sparge steam. As the sparge steam has a higher temperature than the steam in the main condenser 10, the deaerated water in the reservoir 50 has a greater temperature and pressure than the condensate in the hotwell 20. The deaerated incoming water is sprayed into the lower temperature and pressure of the hotwell 20 to flash cool the water to approximately the same temperature as the condensate in the hotwell. The condensate and water may be circulated to the boiler or any other designated location in the system.

Third Configuration

Referring to FIG. 4, the third configuration accommodates incoming water having a temperature greater than the temperature of the available steam. To achieve the required deaerating temperature differential, the third configuration flash cools the incoming water and raises the temperature and pressure of the steam used to form the sparge steam.

The elements of the third configuration are similar to those of the second configuration, except that the vacuum deaerator 40 of the third configuration includes a cooling section 110 upstream from the deaerating section 120. The third configuration also includes a vapor line 126 fluidly connecting the main condenser 10 and the cooling section 110 of the vacuum deaerator 40. The inlet 103 of the auxiliary deaerator steam ejector 102 of the venting system 90 is connected to the deaerating section 120 of the vacuum deaerator 40 upstream of the packing 46.

Operation of the Third Configuration

In the third configuration, turbine exhaust steam is withdrawn from the main condenser 10. The steam is passed through the thermocompressor 60 to form sparge steam having a temperature and pressure above that of the steam in the main condenser 10. The amount of increase is determined by the operating temperature and pressure of the main condenser 10 and the required deaerating temperature differential. The sparge steam is introduced into the deaerating section 120 downstream of the packing 46.

The vapor line 126 fluidly connects the cooling section 110 to the main condenser 10 and its venting system so that the pressure and temperature of the cooling section 110 is substantially equal to the pressure and temperature of the main condenser 10.

As the temperature and pressure of the incoming water is greater than that in the cooling section 110, the incoming water flash cools as it enters the cooling section 110. The cooled incoming water is collected and sprayed through nozzle 114 as uniform droplets into the deaerating section 120. The descending flash cooled incoming water and the ascending sparge steam contact at the packing 46 to deaerate the incoming water. The venting system 90 removes sufficient water vapor from the deaerating section 120 to cause the release of dissolved gases from the liquid phase and to prevent the reabsorption of noncondensible gases into the liquid phase. The increased temperature of the sparge steam and the flash cooling of the incoming water creates the required deaerating temperature differential.

The heated deaerated incoming water descends and collects in the reservoir 50. As in the second configuration, the deaerated water which accumulates in the reservoir 50 has a temperature and pressure greater than that of the condensate in the hotwell 20. As the deaerated water is introduced into the hotwell 20, the deaerated water flash cools to approximately the same temperature and pressure as the condensate.

Fourth Configuration

Figure 5:
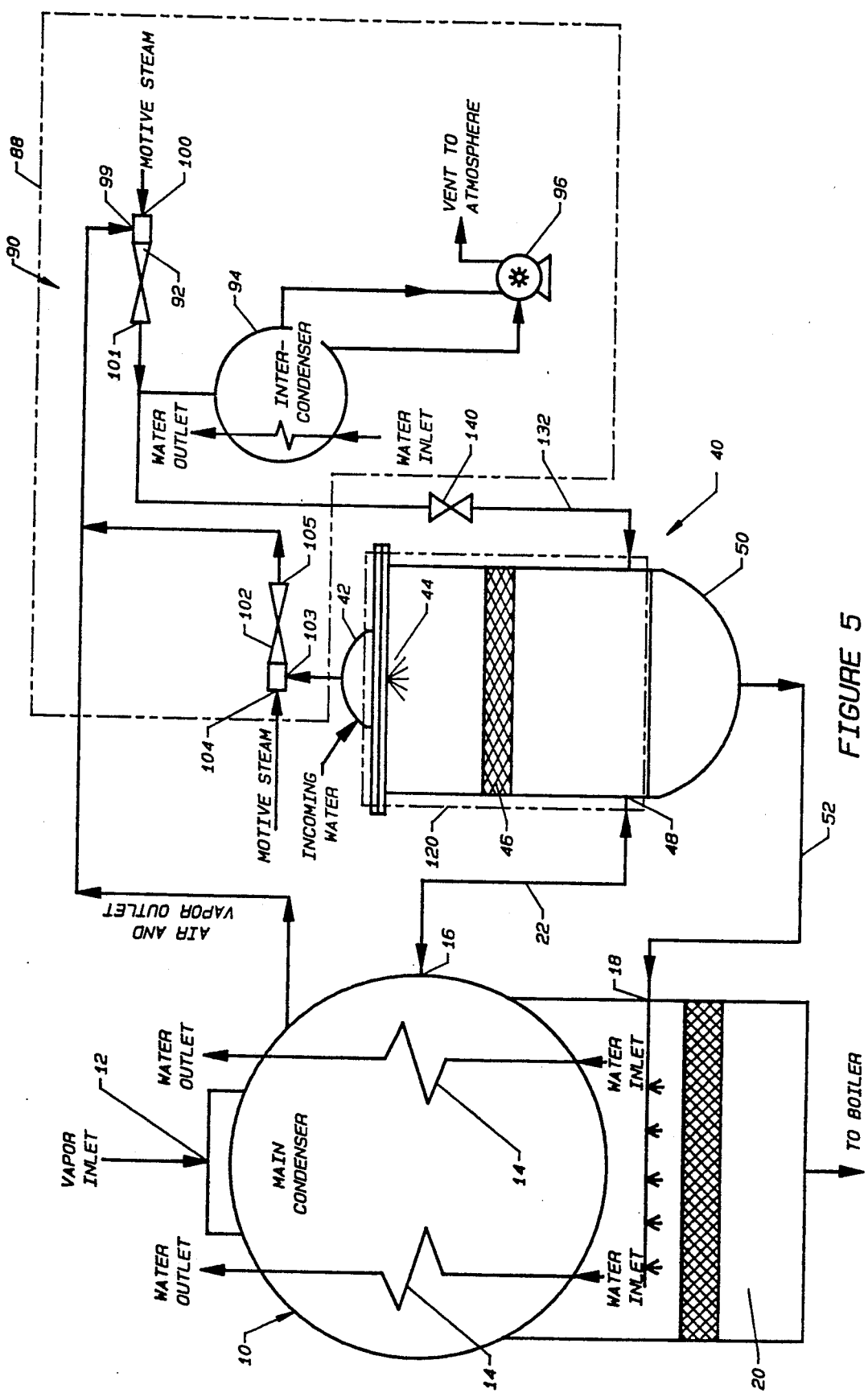
FIG. 5 is a schematic plan of a fourth configuration of the present invention.

Referring to FIG. 5, the fourth configuration accommodates incoming water whose temperature is too near the temperature of the available steam to attain the required deaerating temperature differential. In the fourth configuration, the required deaerating temperature differential is achieved by employing sparge steam from the venting system 90 having a pressure and temperature sufficiently above that of the main condenser 10 to provide the required deaerating temperature differential.

In the fourth configuration, the vacuum deaerator 40 includes only a deaerating section 120. The inlet 103 of the auxiliary deaerator steam ejector 102 of the venting system 90 is connected to the vacuum deaerator 40 upstream of the packing 46. The sparge line 22 connects the main condenser to the vacuum deaerator 40 downstream of the packing 46. An ejector line 132 fluidly connects the output of the first stage ejector 92 of the venting system 90 to the vacuum deaerator 40 downstream of the packing 46. A throttle or regulator 140 is located in line 132 to selectively control fluid flow through the line 132.

Operation of the Fourth Configuration

The incoming water is introduced into the vacuum deaerator 40 through the water box 42. The incoming water passes through the spray valves 44 of the water box 42 to form droplets. The sparge steam enters the vacuum deaerator 40 through the ejector line 132.

The load steam for the first ejector 92 is withdrawn from either or both the main condenser 10 and the vacuum deaerator 40, and raised to a higher temperature and pressure. Therefore the portion of the vapor from the first ejector 92 which is passes through ejector line 132 has a higher temperature and pressure than the steam in the main condenser 10. The amount of steam drawn through ejector line 132 is throttled or controlled by the throttle 140, as required to provide the necessary deaeration. If too great a volume of energized vapor is drawn through ejector line 132, the excess passes through the sparge line 22 into the main condenser 10, and is subsequently condensed or drawn back to the first ejector 92. Therefore, the throttle 140 regulates the amount of steam withdrawn from the exhaust of the first ejector 92 to provide the required deaeration without excessive backflow through the sparge line 22 into the main condenser 10.

As the incoming water descends through the packing 46, the ascending sparge steam scrubs, heats, and deaerates the water. The venting system 90 withdraws a sufficient volume of water vapor and noncondensible gas from the deaerating section 120, to cause the release of dissolved gases from the liquid phase, and to prevent oxygen from being reabsorbed into the liquid phase.

The incoming water is heated to the temperature of the sparge steam. As the sparge steam has a higher temperature than the steam in the main condenser 10, the deaerated incoming water in the reservoir 50 has a greater temperature and pressure than the condensate in the hotwell 20. The deaerated incoming water is sprayed into the lower temperature and pressure of the hotwell 20. Therefore, the deaerated incoming water flash cools to approximately the same temperature as the condensate in the hotwell 20, and may be circulated to the boiler or other designated location in the system.

While preferred embodiments of the invention have been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A method for deaerating incoming water in a vacuum deaerator, comprising:
   (a) introducing sparge steam into a deaerating section of the vacuum deaerator;
   (b) introducing incoming water into a cooling section of the vacuum deaerator; and
   (c) reducing the pressure in the cooling section to a pressure sufficient to cause the incoming water to flash cool.

2. The method of claim 1, further comprising the step of removing water vapor from the cooling section of the vacuum deaerator.

3. The method of claim 2, further comprising the steps of:
   (a) raising the temperature of the removed water vapor; and
   (b) introducing the removed water vapor having a raised temperature into the deaerating section of the vacuum deaerator.

4. An apparatus for deaerating incoming water in a steam generation system having a vacuum deaerator for deaerating incoming water, comprising:
   (a) means for withdrawing water vapor from a cooling section of the vacuum deaerator to induce flash cooling of the incoming water;
   (b) means for raising the temperature of the withdrawn water vapor; and
   (c) means for introducing the heated withdrawn water vapor into a deaerating section of the vacuum deaerator.

5. An apparatus for deaerating incoming water in a steam generation system having a vacuum deaerator, comprising:
   (a) means for reducing the pressure in a cooling section of the vacuum deaerator to cause at least a portion of the incoming water to flash cool upon introduction into the cooling section; and
   (b) means for introducing a sparge steam into a deaerating section of the vacuum deaerator.

6. A method for deaerating incoming water in a vacuum deaerator, comprising:
   (a) reducing the pressure in a cooling section of the vacuum deaerator by withdrawing water vapor from the cooling section so that incoming water flash cools upon introduction into the cooling section.
   (b) raising the temperature of the withdrawn water vapor; and
   (c) introducing at least a portion of the heated withdrawn water vapor into a deaerating section of the vacuum deaerator.

7. The method of claim 6, further comprising fluidly connecting the deaerating section of the vacuum deaerator to the main condenser such that the pressure in the deaerating section is substantially equal to the pressure in the main condenser.

8. The method of claim 6, further comprising flash cooling the incoming water to a temperature sufficient to induce substantial deaeration of the incoming water upon introduction of the flash cooled incoming water into the deaerating section of the vacuum deaerator.

9. A method for deaerating incoming water in a vacuum deaerator having a cooling section and a deaerating section, comprising:
   (a) introducing incoming water into the cooling section of the vacuum deaerator;
   (b) reducing the pressure in the cooling section of the vacuum deaerator to flash cool at least a portion of the incoming water;
   (c) introducing the flash cooled incoming water into the deaerating section of the vacuum deaerator; and
   (d) introducing a sparge steam into the deaerating section of the vacuum deaerator to substantially deaerate the flash cooled incoming water.

* * * * *